INVENTOR.
Robert E. Nelson
BY
Warren D. Hill
ATTORNEY

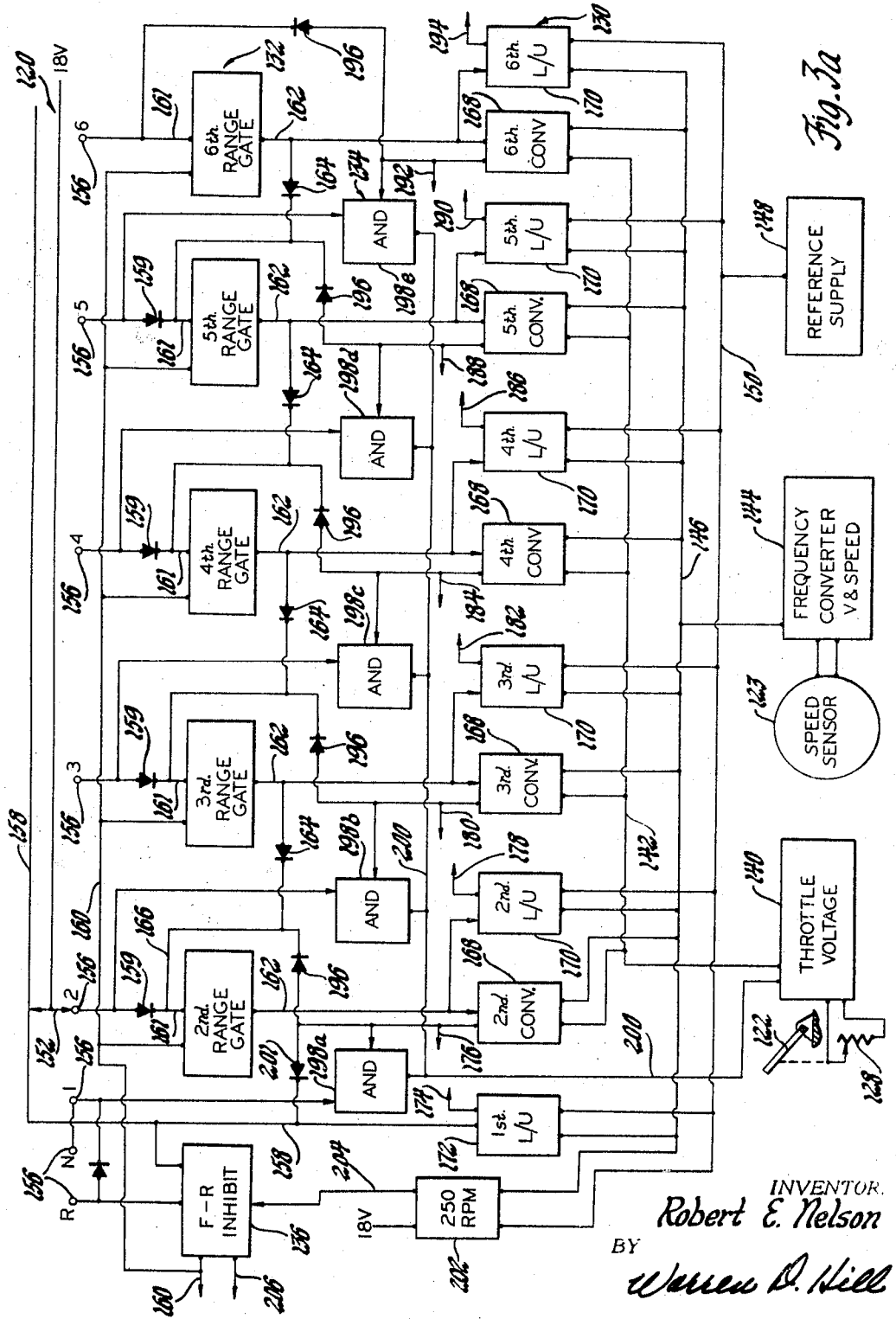

INVENTOR.
Robert E. Nelson
BY
Warren D. Hill
ATTORNEY

United States Patent Office 3,448,640
Patented June 10, 1969

3,448,640
ELECTRICAL CONTROL FOR AUTOMATIC TRANSMISSION
Robert E. Nelson, Indianapolis, Ind., assignor to General Motors Corporation, Detroit, Mich., a corporation of Delaware
Filed June 30, 1967, Ser. No. 650,307
Int. Cl. G05g 13/02
U.S. Cl. 74—866    11 Claims

ABSTRACT OF THE DISCLOSURE

A solid state electronic control is provided for an automatic vehicle transmission. The control is responsive to instantaneous values of throttle setting and transmission output speed and the position of a manual range selector switch. The control includes a shift pattern generator for producing signals indicating desired shifts and a computer circuit responsive to the signals for energizing appropriate solenoids for effecting the shifts. The solenoids control hydraulic circuitry for actuating the brakes and clutches in the transmission.

---

This invention relates to an electrical control for an automatic transmission, particularly for a transmission of the kind used in automotive vehicles employing a plurality of forward speed ranges, a neutral range and at least one reverse range.

Automatic transmissions conventionally employ hydraulic means to control shifting from one gear range to another, and include in addition to the basic shifting function, a number of protective features, for example, the prevention of shifting between forward and reverse ranges at high vehicle speeds and convenience features such as forced downshifting when the transmission is operating at a high forward range and a low or reverse range is selected. Rudimentary electrical transmission controls have been proposed to carry out the basic shifting function but the additional features necessary for a practical control have, for the most part, been omitted. Such proposed controls also have been generally limited to operation of specific types of transmissions or to transmissions having a specific number of gear ratios, and usually have been limited to circuits responsive to only discontinuous events of the control parameters rather than monitoring continuous changes in the parameters.

A general object of this invention is to provide an electrical control for an automatic transmission.

Another object is to provide an electrical control applicable to many types of transmisisons and to transmissions having any number of gear ratios.

Another object is to provide an electrical control for an automatic transmission governed by an engine operating parameter and a transmission speed parameter.

Still another object is to provide an electrical control for an automatic transmission controlled by engine throttle position, transmission output speed and the manually operated range selector switch.

Yet another object is to provide a solid state electronic control for an automatic transmission.

The invention is carried out by providing an electrical circuit for operating ratio change means in an automatic transmission.

The invention is further carried out by providing a solid state electronic circuit for controlling ratio change means in an automatic transmission, the circuit being responsive to a range selector switch, an engine operated parameter and a transmission output parameter. More specifically, these parameters are preferred to be the engine throttle position and the speed of the transmission output shaft.

The invention is further carried out by providing shift pattern generator circuits continuously responsive to the instantaneous conditions of throttle position and transmission output speed and these circuits further being enabled by additional circuits which are controlled both by the operation of a range selector switch and by the output of the shift pattern generator circuits.

The invention is also carried out by providing forced downshift circuits responsive to both the range selector circuits and shift pattern generator circuits to supply through detent throttle signals to the shift pattern generator circuits to expedite downshifting when the selector switch is moved to reverse, neutral or a forward range lower than that at which the transmission is operating, or when the accelerator pedal is moved to a position beyond full throttle position.

The invention is additionally carried out by providing further circuits for preventing a shift from a forward range to neutral or reverse range and from reverse to forward ange when the transmission output speed is above a predetermined value.

The above and other advantages will be made more apparent from the following specification taken in conjunction with the accompanying drawings wherein like reference numerals refer to like parts and wherein.

Figure 3B:
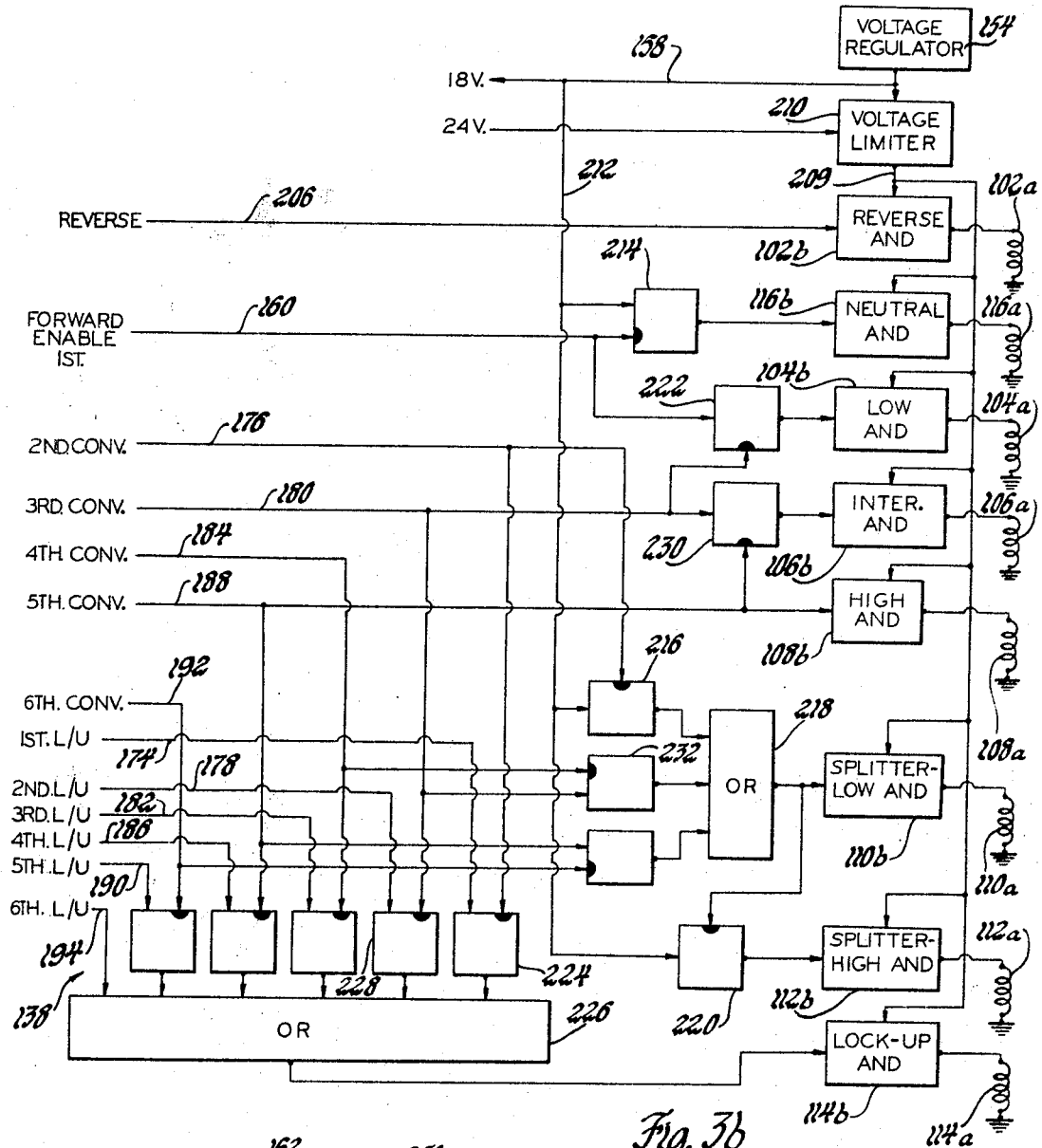
Figure 4:
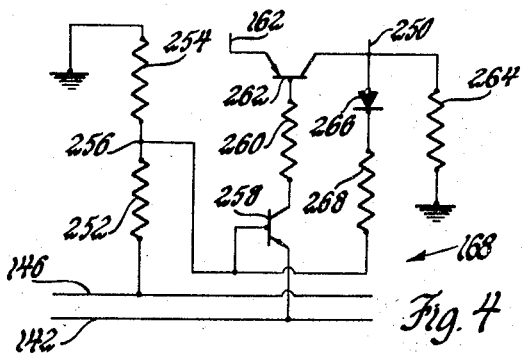
Figure 5:
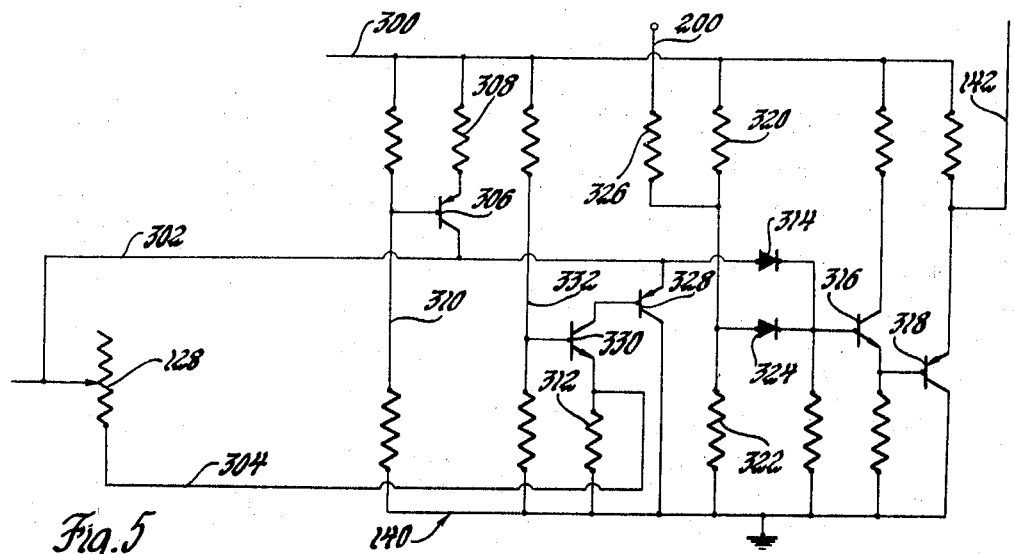
Figure 6:
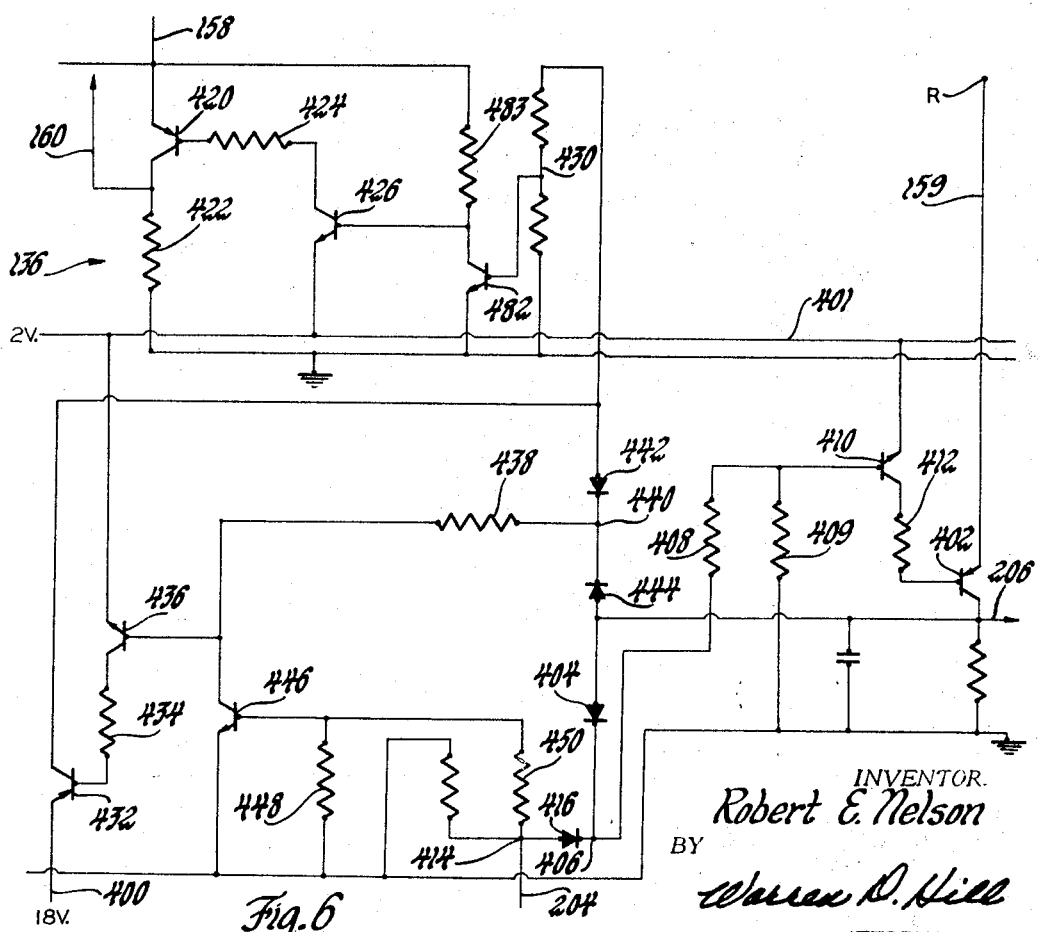
Figure 7:
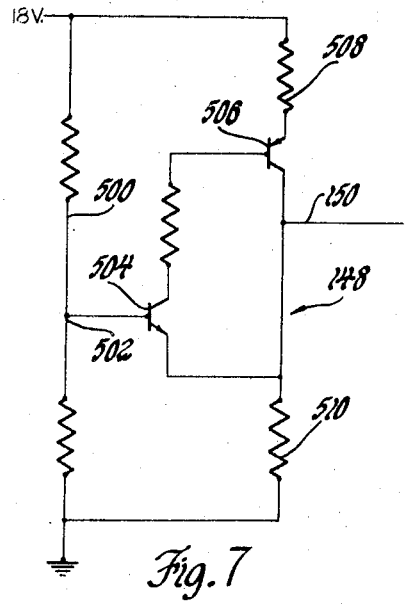
Figure 8:
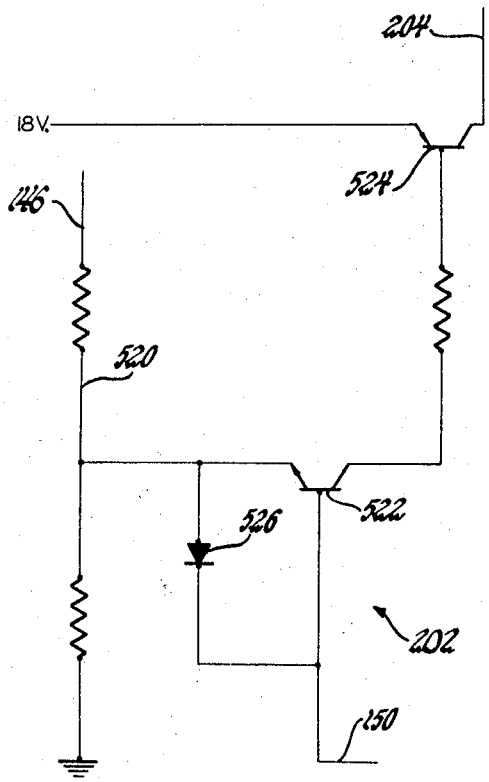
Figure 9:
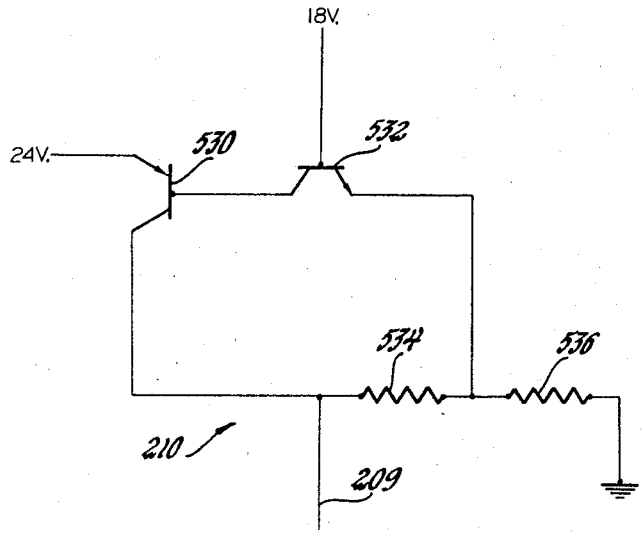

FIGURE 3a and 3b taken together comprise a block diagram of an electrical control circuit according to the invention;

FIGURE 4 is a schematic circuit diagram of a comparator gate of FIGURE 3;

FIGURE 5 is a schematic circuit diagram of the throttle voltage generator of FIGURE 3;

FIGURE 6 is a schematic circuit diagram of the forward-reverse inhibit circuit of FIGURE 3;

FIGURE 7 is a schematic circuit diagram of the reference supply of FIGURE 3;

FIGURE 8 is a schematic circuit diagram of the 250 r.p.m. circuit of FIGURE 3; and, FIGURE 9 is a schematic circuit diagram of the voltage limiter circuit of FIGURE 3.

It is intended that the control of this invention be applicable to a large variety of automatic transmissions, particularly those in which shifting can be carried out by the operation of brakes or clutches. However, the specific embodiment described herein is designed to apply to a six forward range transmission of the type which is described in detail in the United States patents to Christenson et al. 3,255,642 and Edmunds 3,207,182.

TRANSMISSION GEAR TRAIN

Figure 1:
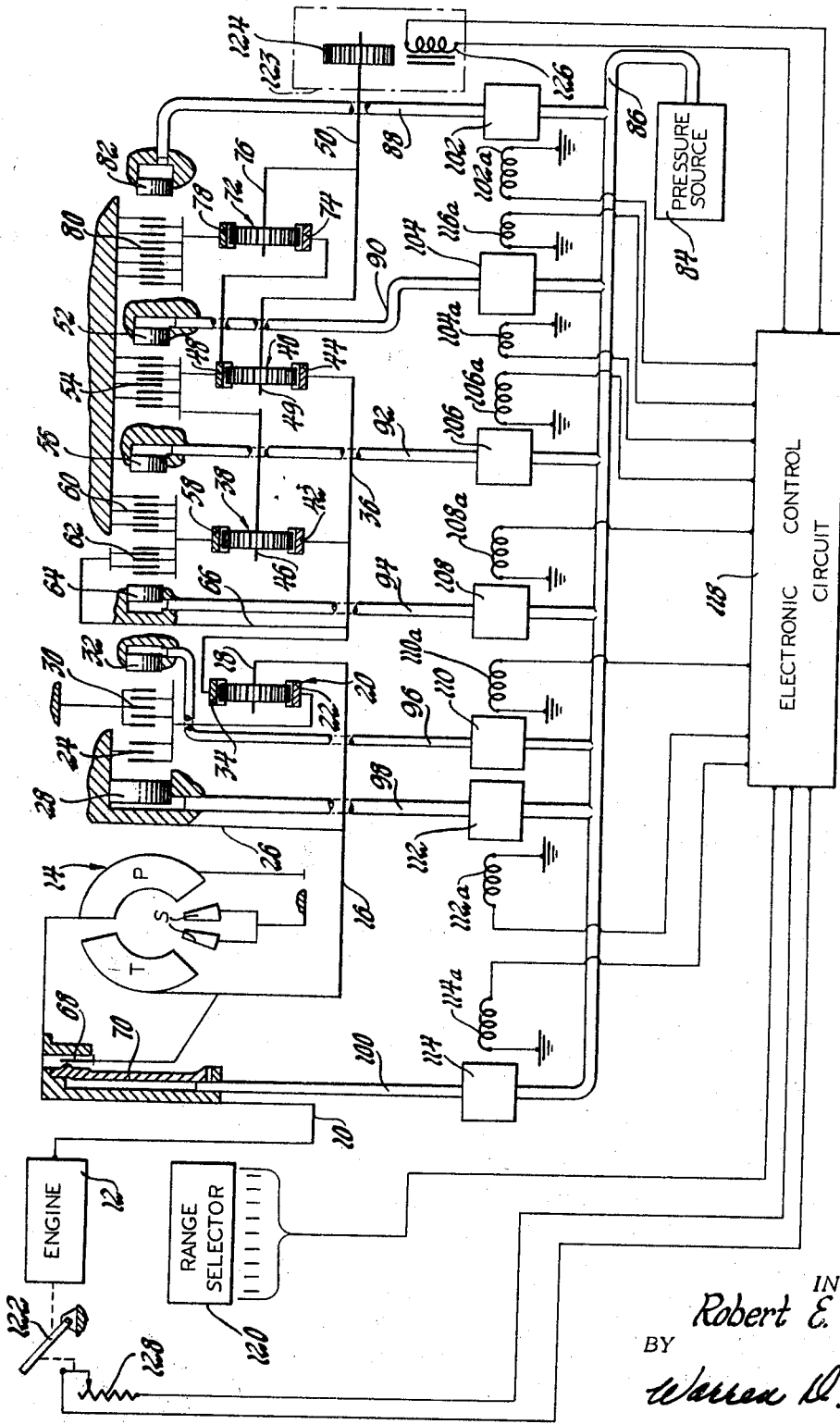
FIGURE 1 is a schematic diagram of a transmission including hydraulic and electrical controls according to the invention.

As shown in FIGURE 1, the transmission includes an input shaft 10 driven by engine 12, which shaft is connected to a torque converter 14. The torque converter output shaft 16 drives the carrier 18 of the planetary gear set 20 which functions as a splitter gear. The splitter gear provides a low ratio by connecting the sun gear 22 to the shaft 16 via a clutch 24 and a hub 26. The clutch 24 is operated by a fluid motor 28. Splitter high drive is effected by connecting the sun gear 22 to ground by brake 30 which is actuated by fluid motor 32. The ring gear 34 is connected by intermediate shaft 36 to a three-speed gear set comprising planetary gear sets 38 and 40 wherein the sun gears 42 and 44 are connected to the intermediate shaft 36, the carrier 46 is connected to the ring gear 48 and the carrier 49 of gear set 40 is connected to the output shaft 50. In low ratio, the fluid motor 52 is actuated to connect the carrier 46 and ring gear 48 to ground via brake 54. To effect intermediate ratio, fluid motor 56 is actuated to ground the ring gear 58 of gear set 38 via brake 60. High ratio or direct drive is provided by a clutch 62 actuated by fluid motor 64 to connect the ring gear 58 to intermediate shaft 36 through hub 66. Thus, the six forward drive ratios are provided by using either splitter low or high with low, intermediate or high of the rear unit. Moreover, for each of the six drive ratios or ranges, a converter lock-up condition may be obtained by coupling the input shaft 10 and shaft 16 through the clutch 68 which is operated by fluid motor 70. A reverse planetary gear set 72 has its sun gear 74 connected to ring gear 48 of the gear set 40 and its carrier 76 connected to the output shaft 50. Reverse gear is established by grounding the ring gear 78 through brake 80 which is actuated by fluid motor 82.

The fluid motors are operated by a hydraulic system shown in FIGURE 1 in simplified form which includes a hydraulic pressure source 84 supplying pressure to a conduit 86 having branch conduits 88, 90, 94, 96, 98 and 100 communicating with the fluid motors 82, 52, 56, 64, 32, 28 and 70 respectively each of the branch conduits being controlled by solenoid actuated shift valves 102, 104, 106, 108, 110, 112 and 114 respectively. The shift valves 102–114 are activated by solenoids 102a–114a. The shift valves are normally closed so that fluid pressure is supplied to each fluid motor only when its corresponding shift valve is energized. In addition, the shift valve 104 has an additional solenoid 116a associated therewith to assure the shift valve 104 becomes closed when solenoid 116a is energized. Those skilled in the art will immediately recognize that additional hydraulic circuit features may be incorporated as necessary, such as means to exhaust fluid from a fluid motor upon closing of its corresponding solenoid valve and trimmer valves to avoid engagement shock.

The solenoids 102a–116a for the shift valves 102–114 are operated by an electronic control circuit 118 according to the program set forth in the following table wherein X denotes which solenoids are energized to effect any given range. The terms first converter, second converter, etc., refer to those modes of transmission operation wherein the power flows through the torque converter 14 while the terms first lock-up, second lock-up denote that the torque converter has been locked up by operation of clutch 68.

linkage. The potentiometer resistance is a linear function of the throttle opening except that a through detent resistance value is provided when the accelerator pedal is forced beyond the full throttle position.

Figure 2:
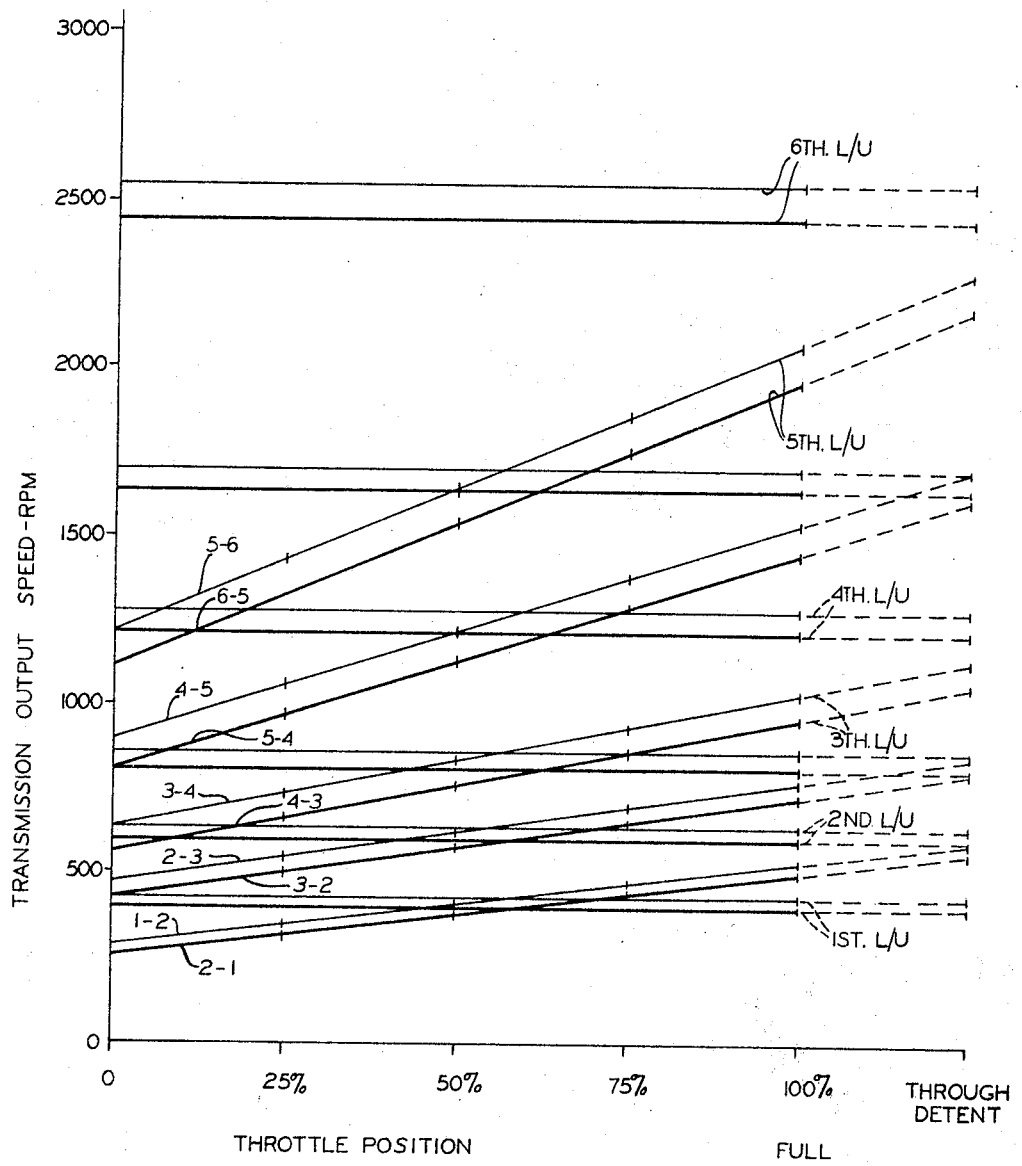
FIGURE 2 is a graphical illustration of a transmission shift pattern.

The primary purpose of the electronic control circuit is to serve as a shift pattern generator for causing operation of the solenoids 102a–116a to effect ratio changing according to the shift pattern illustrated in the graph of FIGURE 2. The graph comprises five pairs of sloped straight lines corresponding to shifts between adjacent ranges or ratios. For each pair, the upper line indicates the desired upshift points, and the lower line denotes the downshift points, the spaces between the two, of course, indicating hysteresis in the control circuit for the prevention of oscillation between gear ranges. The lowermost pair of sloped lines denotes the shift between first and second range, the next higher pair of lines denotes the shift between second and third ranges and so forth. It will thus be seen that each shift must be effected according to a predetermined relationship between the transmission operating speed and the throttle position with the shifts occurring at higher speeds at full throttle than at closed throttle. The dotted lines, which are extensions of the full lines, are to indicate shift points which occur at a throttle through-detent position, which does not correspond to an actual position of the engine throttle, but rather is an artificial signal used to expedite forced downshift. The graph of FIGURE 2 further includes six pairs of horizontal lines which denote the points where lock-up upshift and downshift occur in each range. It is evident that the lock-up shifts occur as a function of output speed only. Moreover, it may be noted that for the first through fifth ranges, the lock-up function is operative only for throttle positions above about 60 or 65%. For example, if the throttle position is maintained at 25% and the output speed increases, a 1–2 shift will occur and as the speed further increases a 2–3 shift will occur and so on through the sixth range, because as further described below, the first lock-up can occur only when the transmission is in first range, the second lock-up can occur only when the lock-up is in second range, etc. However, in the case where the throttle position is held at, say; 100% and the speed is increased, the first lock-up shift will occur before the 1–2 shift which will be followed by the second lock-up shift and the 2–3 shift, etc.

| Transmission Mode | Solenoid | | | | | | | |
|---|---|---|---|---|---|---|---|---|
| | 104a Low | 106a Inter. | 108a High | 110a Split Low | 112a Split High | 114a Lock Up | 102a Rev. | 116a Neut. |
| Reverse | | | | X | | | X | X |
| Neutral | | | | X | | | | X |
| 1st Convert | X | | | X | | | | |
| 1st Lock Up | X | | | X | | X | | |
| 2d Convert | X | | | | X | | | |
| 2d Lock Up | X | | | | X | X | | |
| 3d Convert | | X | | X | | | | |
| 3d Lock Up | | X | | X | | X | | |
| 4th Convert | | X | | | X | | | |
| 4th Lock Up | | X | | | X | X | | |
| 5th Convert | | | X | X | | | | |
| 5th Lock Up | | | X | X | | X | | |
| 6th Convert | | | X | | X | | | |
| 6th Lock Up | | | X | | X | X | | |

Note.—X=Solenoid Energized.

ELECTRONIC CONTROL CIRCUIT

The electronic control circuit is controlled by three parameters; the position of a normally operated range selector switch 120, the position of a throttle operated by throttle linkage 122 and the speed of the transmission output shaft 50. The latter is preferably detected by a pulse generator 123 comprising a toothed member 124 driven by the output shaft 50 and an adjacent inductor pickup 126 which generates a pulse every time a tooth of member 124 passes the pickup so that the frequency generated in the pickup device is proportional to output speed. The throttle position is detected by a potentiometer 128 having its sliding contact operated by the throttle

*Shift pattern generator*

The means for carrying out the shift pattern will now be described with reference to FIGURES 3a and 3b, FIGURE 3a being generally referred to as a shift pattern generator and FIGURE 3b as a computer circuit. The chief components of the shift pattern generator circuit are the r.p.m. logic circuit 130, the range logic circuit 132, the downshift automatic through-detent circuit 134, each of which is depicted as a horizontal series of blocks with interconnecting lines, and a forward-reverse inhibit circuit 136. The computer circuit 138 receives signals from the shift pattern generator and directly controls the solenoids 102a–116a.

As mentioned previously, the throttle linkage 122 controls a potentiometer 128. This variable resistance in turn is connected to a throttle voltage generator 140 which supplies to the r.p.m. logic circuit 130 a voltage proportional to throttle position plus a minimum voltage via line 142. The speed sensor 123, as mentioned before, produces an output frequency proportional to the transmission output speed. This frequency signal is fed to a frequency converter 144 which produces an output voltage proportional to transmission output speed. This voltage is conducted to the r.p.m. logic circuit 130 by line 146. A reference supply 148 for the r.p.m. logic circuit 130 produces a constant output voltage which is varied only to afford temperature compensation and is fed to circuit 130 by line 150.

The range selector switch 120 comprises a manually movable contact 152 which is connected to a voltage regulator 154 (FIGURE 3b) to provide an 18 volt supply of power. The contacts 152 are selectively engageable with a plurality of contacts 156, each corresponding to a transmission range, that is, reverse, neutral, first, second, etc. The contacts 156 corresponding to the second through sixth ranges are each connected to one of five gates labeled "2nd range gate" through "6th range gate" which taken together with interconnecting lines comprise the range logic circuit 132. So long as the range selector switch is in the forward range, the contact 152 also connects with a forward supply line 158 which feeds 18 volts to the forward-reverse inhibit circuit 136 and under usual conditions to be described below, is fed to line 160 which in turn is connected through diodes 159 to inputs 161 of each of the range gates and also passes a signal to the computer circuit 138. Each of the range gates is an AND gate which has the function of passing the 18 volts of line 160 to the gate output 162 whenever a voltage is applied to the gate input 161. The output 162 of each range gate except the second range gate is connected through a diode 164 to the input 161 of the adjacent lower range gate. For example, if the input of the third range gate is energized, it will have an output which is fed through diode 164 and line 166 to the input of the second range gate so that the latter will also have an output. The output 162 of each gate is further connected to a pair of comparator gates 168 and 170, a plurality of such pairs of gates along with the comparator gate 172 comprising the r.p.m. logic circuit. These comparator gates are denominated converter gates 168 and lock-up gate 170 and 172. Thus, the output 162 of the second range gate is fed to inputs of the second converter gate 168 and the second lock-up gate 170. Similarly, the output 162 of the third range gate is fed to inputs of the third converter gate and third lock-up gate and so forth. In addition, the forward supply line 158 is connected to the input of the first lock-up gate 172.

When the comparator gates 168, 170 and 172 are enabled, the input voltages from lines 158 and 162 are passed to the gate outputs 174–194 corresponding to first lock-up gate, second converter gate, second lock-up gate, etc. The converter gates 168 are enabled by the throttle voltage carried by line 142 and the speed voltage carried by line 146. For example, the second converter gate compares the two enabling voltages and when the voltages achieve the relationship set forth by the 1–2 shift line in FIGURE 2, the gate is turned on and the output is produced at 176 to call for an upshift to second converter range. Similarly, when the throttle and speed signals reach a value denoted by the 2–3 shift line of FIGURE 2, the third converter gate will produce an output at 180 to call for a shift to third converter range. On the other hand, when the throttle and speed voltage relationship falls below the 3–2 line of FIGURE 2, the output 180 of the third converter gate will be removed to effect a return to second converter range since the second converter output has remained on. All the converter gates 168 operate in a similar manner but each being designed to follow its corresponding shift lines of FIGURE 2. The lock-up gates 170 and 172 are enabled by the speed signal carried by line 146, it being compared by the gates to the reference signal carried by line 150. Thus, when the first lock-up gate 172 receives a speed signal corresponding to 420 r.p.m. as depicted by the first lock-up upshift line of FIGURE 2, an output signal will be produced at output 174 of the first lock-up gate 172 and when the speed signal falls below the first lock-up downshift line of FIGURE 2, the signal will be removed from output 174. The other lock-up gates operate in a like manner except, of course, they are adjusted to respond to their corresponding speed values as set forth in FIGURE 2. Each of the converter gate outputs are connected through diodes 196 of the input 161 of its corresponding range gate to provide a holding circuit so that irrespective of the position of the range selector switch 120, the input and output of the converter gate after being enabled will not be interrupted as long as the appropriate speed and throttle signals are applied thereto.

The downshift automatic through-detent circuit 132 comprises five AND gates 198a through 198e each having a first input supplied from a converter gate output and having a second input connected to one of the contacts 156 of switch 120 so arranged that the first input is from a converter gate for the next higher range than the second input; e.g., AND gate 198e has its first input connected to the output 192 of the sixth converter gate and its second input connected to the switch contact 5. The neutral and reverse contacts of switch 120 are connected to switch contact 1, which is, in turn, connected to an input of AND gate 198a. The AND gates 198 have a common output line 200 which is fed to the throttle voltage generator 140 and as will be explained later, effects an artificial through-detent throttle voltage signal in line 142. The output 176 of the 2nd converter gate is connected through a diode 201 to the forward supply line 158 to ensure that so long as the shift pattern generator has an output for 2nd converter range or higher the forward supply line will be energized. To meet power requirements, an amplifier may be substituted for the diode 201. The effect of the downshift automatic through-detent circuit 134 is to produce a through-detent voltage whenever the range selector switch 120 is moved to a range lower than the range in actual operation or to neutral or reverse. This will cause one of the AND gates to have both inputs energized, thereby producing an output in line 200. For example, if the transmission is operating in fifth range and the selector switch is moved to reverse, a signal will be fed to the input of the AND gate 198a which is connected with the reverse switch contacts and the other input to the same AND gate will be energized by the output 176 of the second converter gate 168 (keeping in mind that every converter gate maintains an output so long as its corresponding range or a higher range is in operation). Then the AND gate 198a will have an output to effect a through-detent signal.

A 250 r.p.m. gate 202 has an 18 volt input and further has an enabling gate connected to the speed voltage line 146 and the reference voltage line 150 and is so arranged that it will produce an 18 volt output in line 204 whenever the speed is below 250 r.p.m. but no output above that speed.

The forward-reverse inhibit circuit is a special feature which prevents shifting from forward range or neutral to reverse range when the output speed is in excess of 250 r.p.m. and prevents shifting to forward range anytime the transmission is operating in reverse range at speeds in excess of 250 r.p.m. The output 204 from the 250 r.p.m. gate 202 is applied to the forward-reverse inhibit circuit 136 to control this function. Thus, when the above conditions are met, and a forward range is selected, the forward enable line 160 leading to the range logic circuit and also leading to the computer circuit 138 is energized. Similarly, when the reverse range is selected and the output speed is within the 250 r.p.m. limit, the reverse enable output 206 is energized.

The operation of the circuit thus far described is as follows. Assuming the vehicle is at a standstill and, say, the fifth range is selected, the fifth range gate will be enabled and due to the interconnection of the range gates through diodes 164, all lower range gates will be enabled and the inputs to their corresponding converter gates and lock-up gates will be energized. As will be seen later, the forward signal from line 160 will place the transmission in the first converter range. As the throttle is depressed, say at 100% open position, the vehicle speed will increase until the speed signal in line 146 is sufficient to enable the first lock-up gate to produce an output at 174. As the speed further increases, the relative values of the throttle voltage and the speed voltage will be adequate to enable the second converter gate 168 to produce an output at 176. As the speed further increases, the second lock-up gate will be enabled to produce a signal at output 178. This sequence will continue until the fifth lock-up gate has been energized to produce an output signal at 190. It will not be possible for the 6th converter gate or 6th lock-up gate to become enabled because there is no energized output from the sixth range gate. If the range selector switch is then shifted to third range, the transmission operation will continue in the fifth range due to the action of the holding circuit from the output of the fifth converter gate through the diode 196 to the input of the fifth range gate. The fifth lock-up gate and fifth converter gate will remain energized until the enabling signals, that is, the speed and throttle voltages diminish to points calling for downshift. This is hastened by the downshift automatic through-detent circuit 134 wherein AND gate 198c has one input energized by the input of switch contact 3 and the other input to that gate is energized from the output 184 of the fourth converter gate. The AND gate output is fed to the throttle voltage generator 140 by line 200 to produce a through-detent voltage which will achieve the maximum rate of downshifting as the vehicle speed decreases. The fifth lock-up gate, fifth converter gate, the fourth lock-up gate, and fourth converter gate in that order will become disabled when the output 184 of the fourth converter gate is lost, that input to the AND gate 198c is lost and the AND gate output will cease, thereby allowing the return to normal throttle modulation of the r.p.m. logic circuit 130. With the loss of outputs from the fourth and fifth converter gates, their holding circuits including diodes 196 become ineffective and the fourth and fifth range gates are disabled, thereby inhibiting upshift above the selected range.

*The computer circuit*

The computer circuit 138 shown in FIGURE 3b in the form of a logic circuit, provides the function of energizing the appropriate solenoids 102a through 116a according to the program of the above table in response to the outputs of the r.p.m. logic circuit 130 and forward-reverse inhibit circuit 136. The voltage regulator 154 is a power supply for providing the current and voltage levels for operating the control circuits, specifically, for energizing the 18 volt line previously referred to. A 24 volt line 209 monitored by a voltage limiter 210 is connected to each of the solenoid controlling AND gates 102b–116b. The other boxes depicted in the computer circuit 138 are OR gates and inhibit gates which latter are denoted by a semicircular dot at the inhibit signal input. Each inhibit gate will pass its input to the output except when a signal is present at the inhibit input.

When no range signals or shift signals are applied to the computer circuit, the 18 volt line will be connected through line 212, the inhibit gate 214 and the neutral AND gate 116b to the neutral solenoid 116a. 18 volts is also applied through 212, through inhibit gate 216, and OR gate 218 to the splitter-low AND gate 110b which energizes solenoid 110a. 18 volts is also applied by line 212 to the splitter-high gate 220 but an inhibit signal is applied to the inhibit input of the gate 220 from the output of the OR gate 218 to prevent the energization of the splitter-high solenoid 112a when the splitter-low solenoid 110a is energized. However, in the event that the splitter-low solenoid becomes deenergized, the inhibit signal is removed from the gate 220 so that the signal from line 212 will be applied to the splitter-high AND gate 112b and solenoid 112a will be energized. Thus, either the splitter-low or splitter-high solenoid will always be energized depending on whether an energizing signal is applied to the splitter-low solenoid. However, the neutral and splitter-low solenoids are energized with no control signals being received by the computer circuit and this meets the conditions for neutral range as specified in the table previously set forth.

When a reverse signal is applied through line 206, the reverse AND circuit 102b passes a signal to energize reverse solenoid 102a and the neutral and splitter-low solenoids 116a and 110a remain energized.

When a forward signal on line 160 is received from the forward-reverse inhibit circuit 136, that signal inhibits gate 214 to deenergize the neutral solenoid 116a and in addition, the signal on line 160 passes through the inhibit gate 222 to enable the low AND gate 104b and energizes the low solenoid 104a so that the low solenoid and the splitter-low solenoid are energized, as prescribed by the table, without the benefit of any signals from the r.p.m. logic circuit 130. Now consider the operation of the computer circuit at high throttle setting as upshift signals are sequentially supplied from the r.p.m. logic circuit 130. When the first lock-up signal is received on line 174, that signal will pass through the inhibit gate 224 and the OR gate 226 to enable the lock-up AND gate 114b so that the lock-up solenoid 114a will be energized in addition to the low and splitter-low solenoids which were previously energized. Then, if the second converter output signal is next received on line 176, the gate 224 will be inhibited to deenergize the lock-up solenoid 114a and in addition, the gate 216 will be inhibited to thereby deenergize the splitter-low solenoid 110a. The inhibit signal is consequently removed from gate 220 to allow the splitter-high AND gate 112b to be enabled and solenoid 112a to be energized. An output from the second lock-up gate is received on line 178 to enable inhibit gate 228, the OR circuit 226 and the lock-up AND gate 114b to energize the lock-up solenoid 114a. An output from the third converter gate on line 180 will inhibit the gate 222 to deenergize low solenoid 104a and will further enable the gate 230 and intermediate AND gate 106b to energize the intermediate solenoid 106a. In addition, the line 180 provides a signal to gate 232, OR gate 218 and splitter-low AND gate 110b to energize the solenoid 110a and deenergize the splitter-high solenoid 112a and further provides an inhibit signal to gate 228 to deenergize lock-up solenoid 114a. Succeeding signals on lines 182–194, when received, will operate the remainder of the computer circuit in the same manner to energize the appropriate solenoids until finally the sixth lock-up condition is attained. For downshifting operations, the signals 174–194 are removed in reverse order and the combination of energized solenoids changes accordingly. It may be seen by inspection of FIGURE 2, during an upshift operation at small throttle opening, say 25%, the 1–2 converter shift will occur before the first lock-up speed is reached, the 2–3 converter shift occurs before the second lock-up speed is reached and so on for the higher ranges. The effect of this is that line 176 will be energized before line 174 to effect the second converter shift and the signal on line 174 will be inhibited by gate 224 since an inhibit signal is applied thereto by line 176, so that, when the first lock-up gate does produce an output at line 174, that output will be ineffective to produce a lock-up shift. In similar manner, the second, third, fourth and fifth lock-up shifts may be avoided. The sixth lock-up circuit, however, will always be effective when the appropriate speed is attained regardless of throttle condition because line 194 is connected directly to OR gate 226 and does not contain an inhibit gate.

CIRCUIT DETAILS

The circuitry for each type of circuit shown as blocks of FIGURE 3 will now be described, except for those conventional circuits such as AND gates, OR gates, inhibit gates, voltage regulator 154, the range gates which are also conventional AND circuits, and the frequency converter 144, all of which are well known in the art.

Comparator gates

The converter gates 168 and the lock-up gates 170 and 172 are identical except for one enabling input line and this description and FIGURE 4 of the drawing applies to both. A converter circuit 168 which as has been mentioned, has an input line 162, and output line 250 which corresponds to any of the converter outputs 176, 180, 184, 188 and 192 and further has enabling input lines 142 for the throttle voltage and 146 for the speed voltage. A voltage divider comprising resistors 252 and 254 is connected between line 146 and ground. The junction point 256 of the resistors is connected to the base of transistor 258. The transistor's emitter is connected to line 142 and its collector is connected through a resistor 260 to the base of a switching transistor 262. The emitter of transistor 262 is connected to the input line 162 and its collector is connected to an output line 250, and is also connected through resistor 264 to ground. The collector of transistor 262 is further connected through a feedback circuit comprising diode 266 and resistor 268, to the base of transistor 258.

In operation, the speed voltage applied on line 146 is divided by the voltage divider so that the signal applied to the base of transistor 258 is determined by the values of resistors 252 and 254 as well as by the voltage of the speed signal. When the voltage applied to the base of transistor 258 exceeds the throttle voltage applied at line 142, the transistor becomes conductive, which in turn allows the transistor 262 to conduct provided that its input line 162 is energized thereby applying the input voltage to the output line 250. Thus, the converter gate compares a portion of the speed voltage to the throttle voltage so that the output will be turned on depending upon the relationship between the voltage and the values of resistors 252 and 254. Each converter 168 has different values for resistors 252 and 254 in order to achieve the several converter shift lines set forth in FIGURE 2. It will be seen that as the throttle position and the corresponding throttle voltage increase, a higher speed and speed voltage is required to effect a shift. The feedback circuit comprising diodes 266 and resistor 268 serves to bias the base of transistor 258 when transistor 262 begins to conduct, thereby providing a snap action switching function. This feedback circuit also provides hysteresis in the switching function so that a slightly different relationship between speed and throttle voltages is required to turn off the converter gate. This accounts for the separation between the upshift and downshift line in FIGURE 2 and is effective to prevent oscillation during switching. The amount of hysteresis is determined by the value of resistor 268. Typical voltages applied to the converter gate are 18 volts in the input 162, .87 to 1.8 volts at 142 and 0–17 volts at the input 146. The lock-up gates 170 and 172 employ a circuit identical to that of the converter gates 168 with the exception that the emitter of transistor 258 is connected to the reference supply 148 by line 150. At 25° C. the voltage of line 148 is 1.28 volts.

Throttle voltage generator

The throttle voltage generator 140 set forth in FIGURE 5 has inputs including an 18 volt supply 300, a through-detent signal line 200, and the lines 302 and 304 from the throttle control potentiometer 128. A transistor 306 has its collector connected to line 302 and its emitter connected through resistor 308 to line 300. A voltage divider circuit 310 connected between line 300 and ground has its center junction connected to the base of transistor 306. This transistor circuit is a constant current generator supplying current through the potentiometer 128 and through a fixed resistor 312 to ground. Consequently, the voltage of line 302 has a value proportional to the throttle position plus a minimum voltage corresponding to that needed for shifting at minimum throttle angle which minimum voltage is established by the resistor 312. The voltage in line 302 is applied through a diode 314 to a power aplifier including transistors 316 and 318, the output 142 being taken from the emitter of transistor 318. Temperature compensation is provided by the diode 314 which has a temperature dependent voltage drop and accordingly, the output voltage of the throttle voltage generator 140 will change with temperature to the proper value to allow for the temperature dependent transistor switching characteristics in the converter gates. The transistors 316 and 318 are selected so that their temperature characteristics cancel each other and accordingly, they will not effect the voltage from diode 314. A voltage divider comprising resistor is connected to collector of a transistor 330, the ground and has its center junction connected to the base of transistor 316 by a diode 324. The resistor values are so selected that the voltage passed by diode 324 is equal to that passed by diode 314 at the lowest throttle position and acts as a back-up to the throttle for protection against fault in the throttle circuit. The through detent signal line 200 is connected to the junction of the voltage divider 322 through a resistor 326. When a through-detent signal is received on line 200, the voltage passed by diode 324 corresponds to the voltage required for through-detent operation. For low throttle operation this voltage is higher than that from line 314. The throttle voltage generator also includes a device for shorting the line 302 to ground in the event of a broken wire or other open circuit in the lines 302 or 304 which lead to the potentiometer. To carry out this function, a switching transistor 328 is connected between the line 302 and ground. The base of this transistor is connected to collector of a transistor 330, the emitter of which is connected to line 304 and the base of which is connected to a voltage divider 332 which extends between line 300 and ground. Normally, transistor 330 will be held non-conductive by the minimum voltage normally present on line 304. However, in the event of an open circuit, line 304 will approach ground potential so that the transistor 330 will conduct, thereby switching on transistor 328 which connects line 302 to ground.

Forward-reverse inhibit circuit

FIGURE 6 illustrates the forward-reverse inhibit circuit 136. Inputs to the circuit are the forward supply line 158, which is energized to 18 volts when the range selector switch 120 is in one of the forward ranges, the reverse contact R on switch 120, which is energized to 18 volts when the switch is in reverse position, and line 204 which is energized to 18 volts when the transmission output speed is below 250 r.p.m. In addition, an 18 volt power supply line 400 and a 2 volt power supply line 401 are provided and are always energized. The outputs of the circuit are the forward enable line 160 and the reverse enable line 206 which energizes the reverse solenoid 102a. A transistor 402 has its emitter connected to the reverse contact R by line 159 and its collector is connected to the reverse output line 206. Line 206 is connected by a diode 404 to a junction point 406 and the junction point 406 is connected through a resistor 408 to the base of a transistor 410. The base of transistor 410 is connected to ground through resistor 409. The emitter of that transistor is connected to the 2 volt line 401 and the collector is connected by the resistor 412 to the base of transistor 402. The 250 r.p.m.

line 204 is connected to junction point 414 which in turn is connected through diode 416 to the junction point 406. In a condition when the selector switch is moved to the reverse position and the speed is below 250 r.p.m., the line 204 and the reverse input line 159 will be energized, then voltage will pass through diode 416 and resistor 408 to the base of transistor 410 turning on that transistor, which in turn will cause transistor 402 to conduct, thereby energizing the reverse output line 206. Then by virtue of the diode 404, a holding circuit will be provided to maintain transistor 410 conducting so long as the reverse output line 206 is energized. Consequently, even if the signal is removed from line 204 by reason of vehicle moving in reverse in speeds exceeding 250 r.p.m., the reverse output signal on line 206 will be maintained. If, however, at those high speeds, the selector switch is moved from reverse, say to neutral, reverse input and output will be removed and the holding circuit through diode 404 will be disabled and reverse cannot be remade until the speed falls below 250 r.p.m. That is, reverse output line can never be energized when the speed is greater than 250 r.p.m.

The forward input 158 is connected to the emitter of transistor 420 and its collector connected to the foward output signal line 160 and is also connected by resistor 422 to ground. The base of transistor 420 is connected through resistor 424 to the collector of transistor 426. The emitter of that transistor is connected to the 2 volt line 401 and the base of that transistor is connected directly to the collector of transistor 482, which collector is also connected to the forward input line 158 through resistor 483 and its emitter is connected to ground. The base of the latter transistor is connected to a biasing voltage divider 430 connected between ground and the collector of the transistor 432. The emitter of that transistor 432 is connected to line 400 and its base is connected through resistor 434 to the collector of transistor 436, the emitter of which is connected to line 401. The base of the latter transistor is connected through a resistor 438 to a junction point 440. A diode 442 is connected between the collector of transistor 432 and the junction point 440 and another diode 444 is connected between the reverse output line 206 and the junction point 440. A shorting transistor 446 has its emitter and collector connected between the base of transistor 436 and ground while its base is connected to ground through resistor 448 and also is connected through resistor 450 to the 250 r.p.m. line 204.

In order for the transmission to be operable in a forward range, transistor 420 must be conducting to energize the forward output line 160. For transistor 420 to be conducting requires that transistor 426 be also conducting and transistor 482 be non-conducting. Transistor 482 is off when the transistors 432 and 436 are off. Therefore, the state of transistor 420 is opposite that of transistor 436. When the speed is below 250 r.p.m., line 204 will be energized and a portion of the voltage thereof will be applied to the base of the shorting transistor 446 by virtue of the resistors 450 and 448, thereby turning on the transistor 446 which shorts the base of transistor 436 to ground, thereby rendering transistor 436 non-conductive and as a result, the transistor 420 will be conductive. Therefore, forward range operation may take place any time the transmission output speed is below 250 r.p.m. When speeds above 250 r.p.m. occur in forward range, the signal from line 204 is removed and the transistor 446 becomes non-conductive, but this does not change the state of transistor 436 since there is no signal on the base of 436 to make it conduct. When, however the transmission is in reverse range above 250 r.p.m., the reverse output line 206 passes voltage to the base of transistor 436 through diode 444 and resistor 438 causing transistor 436 to turn on and the transistor 420 to turn off, thereby preventing a shift to forward range under those conditions. A holding circuit from the collector of transistor 432 through diode 442 and resistor 438 maintains conduction of the transistor 436 even though the reverse input line 159 is deenergized. Therefore, a forward signal will be inhibited until the speed falls below 250 r.p.m. and transistor 446 turns on to ground the base of transistor 436.

Reference supply circuit

FIGURE 7 illustrates the reference supply 148 which has the purpose of providing the voltage to line 150 which is constant at a given temperature in order to provide a reference which at the lock-up circuits 170 and 172 may compare the speed signal. The reference voltage has been selected as 1.28 volts at 25° C., but must vary with temperature to compensate for the temperature dependent switching characteristics of transistor 258 in the lock-up circuit of FIGURE 4. The reference supply circuit includes a voltage divider 500 extending between an 18 volt supply line and ground and having a center tap 502. The resistance value in the voltage divider 500 is such that the voltage at center tap 502 is equal to the desired output voltage plus a voltage equal to the base-emitter drop of transistor 504. That transistor has its base connected to center tap 502 and its emitter connected to the output 150. The collector of transistor 504 is connected to the base of transistor 506, the collector of transistor 506 is connected to the output 150 and its emitter is connected through a resistor 508 to an 18 volt line. The output line 150 is connected to ground through resistor 510. The transistor circuit serves as a power amplifier and in addition, the transistor 504 serves as a temperature compensating means. Since the voltage at center tap 502 is fixed and the base emitter voltage drop of transistor 504 varies with temperature, the voltage at output 150 will likewise vary to compensate for the similar type of temperature variations in transistor 258 in the lock-up circuit.

250 r.p.m. circuit

The 250 r.p.m. circuit 202 which is illustrated in FIGURE 8 has a voltage divider 520 connected between the r.p.m. voltage line 146 and ground. The center tap of the voltage divider 520 is connected to the emitter of transistor 522, the base of which is connected to the reference voltage line 150. The collector of transistor 522 is connected to the base of transistor 524, the emitter of which is connected to 18 volts and the collector of which comprises the output line 204. A diode 526 is connected between the emitter and the base of transistor 522 to prevent excessive voltages across the transistor. The voltage divider 520 has a value such that when the speed voltage drops below that corresponding to 250 r.p.m., the voltage at the emitter of transistor 522 will be low enough to permit that transistor to conduct, which in turn causes conduction of transistor 524 to produce an output signal at line 204.

Voltage limiter

The circuit details of the voltage limiter 210 are illustrated in FIGURE 9. This circuit includes a transistor 530 having its base connected to the collector of another transistor 532 and having its collector connected through resistors 534 and 536 to ground. The output line 209 is connected to the collector of transistor 530 and provides an output having a 24 volt maximum. The emitter of transistor 532 is connected to the junction of resistors 534 and 536. There, unregulated voltage, which is nominally 24 volts, is applied to the emitter of transistor 530. Eighteen volts from the voltage regulator 154 is applied to the base of the transistor 532 to render that transistor conductive. Collector current of transistor 532 passes to the base of transistor 530 allowing a potentially large collector current from the transistor 530. Should the voltage of line 209 tend to exceed 24 volts, the voltage at the junction of resistors 534 and 536 will approach 18 volts thereby reducing the collector current of transistor 532 and cause transistor 530 to limit the voltage on line 209 to 24 volts.

It will thus be seen that a control circuit according to this invention provides a completely solid state circuit except for those devices providing input information and receiving output signals and can be packaged in a compact and rugged package for high reliability. It will further be seen that this control circuit continuously monitors variations in the control parameters for generating shift signals and effecting transmission shift instantaneously when the programmed conditions are met. It will also be seen that the flexible design of this circuit enables any desired shift pattern to be provided depending upon the selection of component values in the shift pattern generator. Moreover, it will be apparent that the transmission control circuit can readily be adapted for transmissions having more than six forward ranges by further repetition of the same type of circuits already present in the shift pattern generator and the computer circuit, and can be adapted to transmissions having fewer than six ranges by deleting some of such circuits.

The embodiment of the invention described herein is for the purpose of illustration and the scope of the invention is intended to be limited only by the following claims.

It is claimed:

1. An electrical control for an automatic transmission driven by an engine comprising, in combination; ratio changing means; first means for generating a first electrical signal which is a function of an engine parameter; second means for generating a second electrical signal which is a function of transmission output speed; and circuit means having an output connected with the ratio changing means for effecting the operation thereof including inputs connected to the first and second means to receive the signals therefrom, and further including means for comparing the signals and producing an output when the signals attain a predetermined relationship.

2. An electrical control for an automatic transmission driven by a throttle controlled engine comprising, in combination; ratio changing means; first means for generating a first electrical signal which is a function of throttle position, second means for generating a second electrical signal which is a function of transmission output speed; and circuit means connected with the ratio changing means for effecting the operation thereof including inputs connected to the first and second means to receive the signals therefrom, and further including a plurality of gate means each for comparing the signals and producing an output when the signals attain a predetermined relationship, each of said gate means being designed to produce an output responsive to signal relationships different from the other gate means whereby the output of each gate means effects a different ratio.

3. An electrical control for an automatic transmission driven by a throttle controlled engine comprising, in combination; ratio changing means; first means for generating a first signal which is a function of throttle position; second means for generating a second signal which is a function of transmission output speed; and gate means connected with the ratio changing means for effecting the operation thereof; said gate means including at least one comparator circuit comprising a voltage divider connected to the second means to receive the second signal therefrom whereby a signal proportional to the second signal is produced, a transistor having a base and emitter electrode, one of the electrodes being connected to the voltage divider to receive the proportional signal and the other electrode being connected to the first means to receive the first signal so that the transistor will begin conducting to effect an output signal whenever the proportional signal becomes larger than the first signal.

4. An electrical control for an automatic transmission as described in claim 3 wherein the gate means includes a plurality of comparator circuits having voltage dividers of different values whereby outputs are produced in response to a plurality of relationships of the first and second signals.

5. An electrical control for an automatic transmission for a vehicle having a throttle controlled engine comprising in combination, ratio changing means, lock-up actuating means, means for generating a speed signal which is a function of vehicle speed, means for generating a throttle signal which is a function of the throttle setting, a plurality of circuit means responsive to the said signals for producing outputs when the signals achieve predetermined relationships, each of the outputs of the circuit means being connected to the ratio changing means to effect operation thereof, and a further plurality of circuit means responsive to the speed signal for producing outputs connected to the lock-up actuating means to effect operation thereof, whereby transmission operation is dependent upon the vehicle speed alone as well as upon the combination of vehicle speed and throttle position.

6. An electrical control for an automatic transmission for a vehicle having a throttle controlled engine comprising, in combination, ratio changing means for effecting several forward transmission ratios, a manually operated range selector switch, means for providing an analog throttle signal as a function of throttle position, means for providing an analog speed signal as a function of transmission output speed, a plurality of range circuits connected to the range selector switch and selectively enabled thereby wherein the output of each range circuit is dependent upon the position of the selector switch, gate means including a plurality of comparator circuits, each having enabling inputs connected to the output of a range circuit and to the two analog signals and having an output connected to the ratio changing means, each comparator gate including means for comparing the analog signals and producing an output when the analog signals achieve a predetermined relationship, whereby the output signals occur as a function of the transmission output speed, the throttle position and the range selector switch position.

7. An electrical control for an automatic transmission for a vehicle having a throttle controlled engine comprising, in combination, ratio changing means for effecting several forward transmission ratios, a manually operated range selector switch, means for providing an analog throttle signal as a function of throttle position, means for providing an analog speed signal as a function of transmission output speed, a plurality of range circuits connected to the range selector switch and selectively enabled thereby wherein the output of each range circuit is dependent upon the position of the selector switch and any given range circuit produces an output when the selector switch is in the position corresponding to that range circuit, and diode means interconnecting the range circuits for enabling all range circuits corresponding to ranges lower than that selected so that range circuit outputs are delivered to the comparator circuit corresponding to the selected range as well as to any comparator circuits corresponding to ranges lower than that selected, gate means including a plurality of comparator circuits each having enabling inputs connected to the output of a range circuit and to the two analog signals and having an output connected to the ratio changing means, each comparator gate including means for comparing the analog signals and producing an output when the analog signals achieve a predetermined relationship, whereby the output signals occur as a function of the transmission output speed, the throttle position and the range selector switch position.

8. An electrical control for an automatic transmission for a vehicle having a throttle controlled engine comprising, in combination, ratio changing means for effecting several forward transmission ratios, a manually operated range selector switch, means for providing an analog throttle signal as a function of throttle position, means for providing an analog speed signal as a function of transmission output speed, a plurality of range circuits connected to the range selector switch and selectively enabled thereby wherein the output of each range circuit is dependent upon the position of the selector switch and any given range circuit produces an output when the selector switch is in the position corresponding to that range circuit, and diode means interconnecting the range circuits for enabling all range circuits corresponding to ranges lower than that selected so that range circuit outputs are delivered to the comparator circuit corresponding to the selected range as well as to any comparator circuits corresponding to ranges lower than that selected, gate means including a plurality of comparator circuits each having enabling inputs connected to the output of a range circuit and to the two analog signals and having an output connected to the ratio changing means, each comparator gate including means for comparing the analog signals and producing an output when the analog signals achieve a predetermined relationship, a holding circuit comprising means connecting the output from each comparator circuit to the input of each corresponding range circuit whereby when an output signal is present at any comparator circuit the output from its corresponding range circuit will be maintained irrespective of the selector switch position; and further including forced downshift means for producing an output when the selector switch is set for a range lower than the range in operation, the downshift means comprising a plurality of AND gates each having inputs connected to the output of a comparator circuit corresponding to one range and to the input of a range circuit corresponding to the adjacent lower range, and means responsive to the AND output for increasing the throttle signal to a high value whereby downshifting to the selected range is expedited.

9. An electrical control for an automatic transmission comprising a selector switch for selecting reverse and forward ranges, ratio changing means, circuit means connected between the selector switch and the ratio changing means including an inhibiting circuit, means producing a low speed input signal when the transmission output speed is less than a predetermined value, the inhibiting circuit having forward and reverse selecting inputs connected to the selector switch and corresponding forward enable and reverse enable outputs providing mutually exclusive output signals for controlling the ratio changing means, and switch means within the inhibiting circuit responsive to all said input signals for allowing a reverse enable output signal to be initiated only when both the low speed input signal and the reverse selecting input are present and for allowing a forward enable output signal to be initiated only when the low speed input signal and the forward selecting input signal are present.

10. An electrical control for an automatic transmission comprising, in combination, a ratio changing means, a shift pattern generator for producing in sequence a plurality of output signals for actuating the ratio changing means, the number of output signals signifying the desired transmission ratio range, the ratio changing means including electrically operated elements for establishing several ratio ranges, first means for generating a first detent signal which is a function of an engine parameter; second means for generating a second detent signal which is a function of transmission output speed; the shift pattern generator including a plurality of circuit means each having an output connected with the ratio changing means for effecting the operation thereof including inputs connected to the first and second means to receive the signals therefrom and further having means for comparing the signals and producing an output when the signals attain a predetermined relationship; and computer circuit means responsive to the output signals for actuating the said elements according to a predetermined program and the number of output signals.

11. An electrical control for an automatic transmission having a torque converter comprising, in combination, a ratio changing means including electrically operated elements for establishing several ratio ranges, a torque converter lock-up actuating means, a shift pattern generator for producing in sequence a first set of signals for controlling the ratio changing means wherein the number of such signals corresponds to the desired ratio range and for producing in sequence a second set of signals for controlling the lock-up actuating means wherein the number of such signals corresponds to a desired lock-up condition for a ratio range, first means for generating a first detent signal which is a function of an engine parameter; second means for generating a second detent signal which is a function of transmission output speed; the shift pattern generator including a plurality of circuit means each having an output connected with the ratio changing means for effecting the operation thereof including inputs connected to the first and second means to receive the detent signals therefrom and further having means for comparing the detent signals and producing an output when the detent signals attain a predetermined relationship; and computer circuit means responsive to the first set of signals for energizing the elements necessary to actuate the range corresponding to the number of the first set of signals and further responsive to the second set of signals for engaging the lock-up actuating means when the number of the second set of signals corresponds to the ratio range in operation.

References Cited

UNITED STATES PATENTS

| 3,019,666 | 2/1962 | Brennan et al. | 74—866 |
| 3,122,940 | 3/1964 | Shimwell et al. | 74—866 |
| 3,267,762 | 8/1966 | Reual | 74—866 |
| 3,354,744 | 11/1967 | Kuhnle et al. | 74—866 |

ARTHUR T. McKEON, *Primary Examiner.*

U.S. Cl. X.R.

74—752; 192—3.5